Nov. 6, 1934.  C. A. SCHALLIS  1,979,845
AUTOMATIC TOASTER
Filed Nov. 4, 1929  5 Sheets-Sheet 1

INVENTOR
Charles A. Schallis
BY Henry Lanahan
ATTORNEY

Nov. 6, 1934.     C. A. SCHALLIS     1,979,845
AUTOMATIC TOASTER
Filed Nov. 4, 1929     5 Sheets-Sheet 2
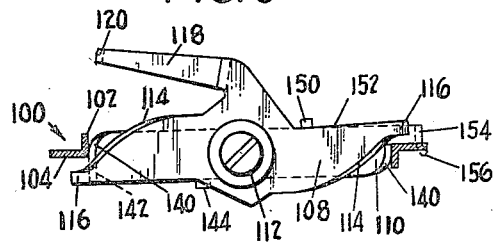
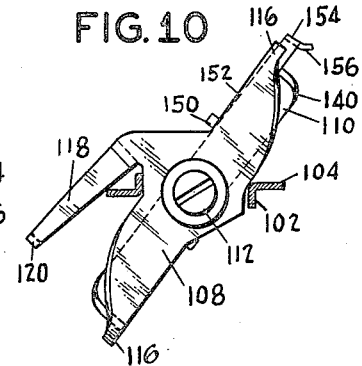
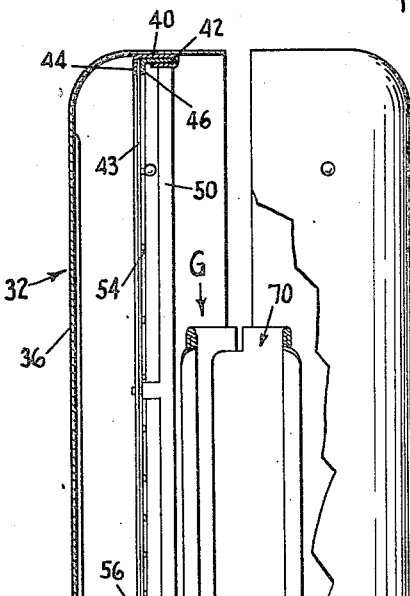
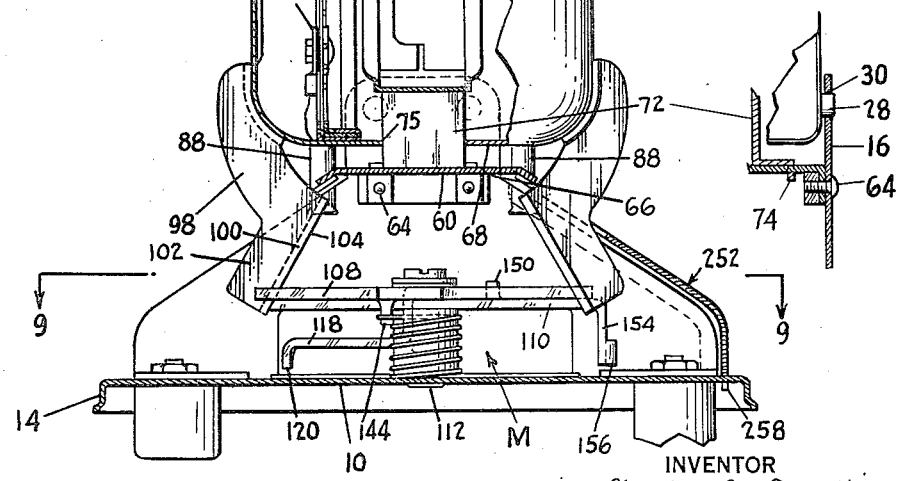
INVENTOR
Charles A. Schallis
BY Henry Lanahan
ATTORNEY

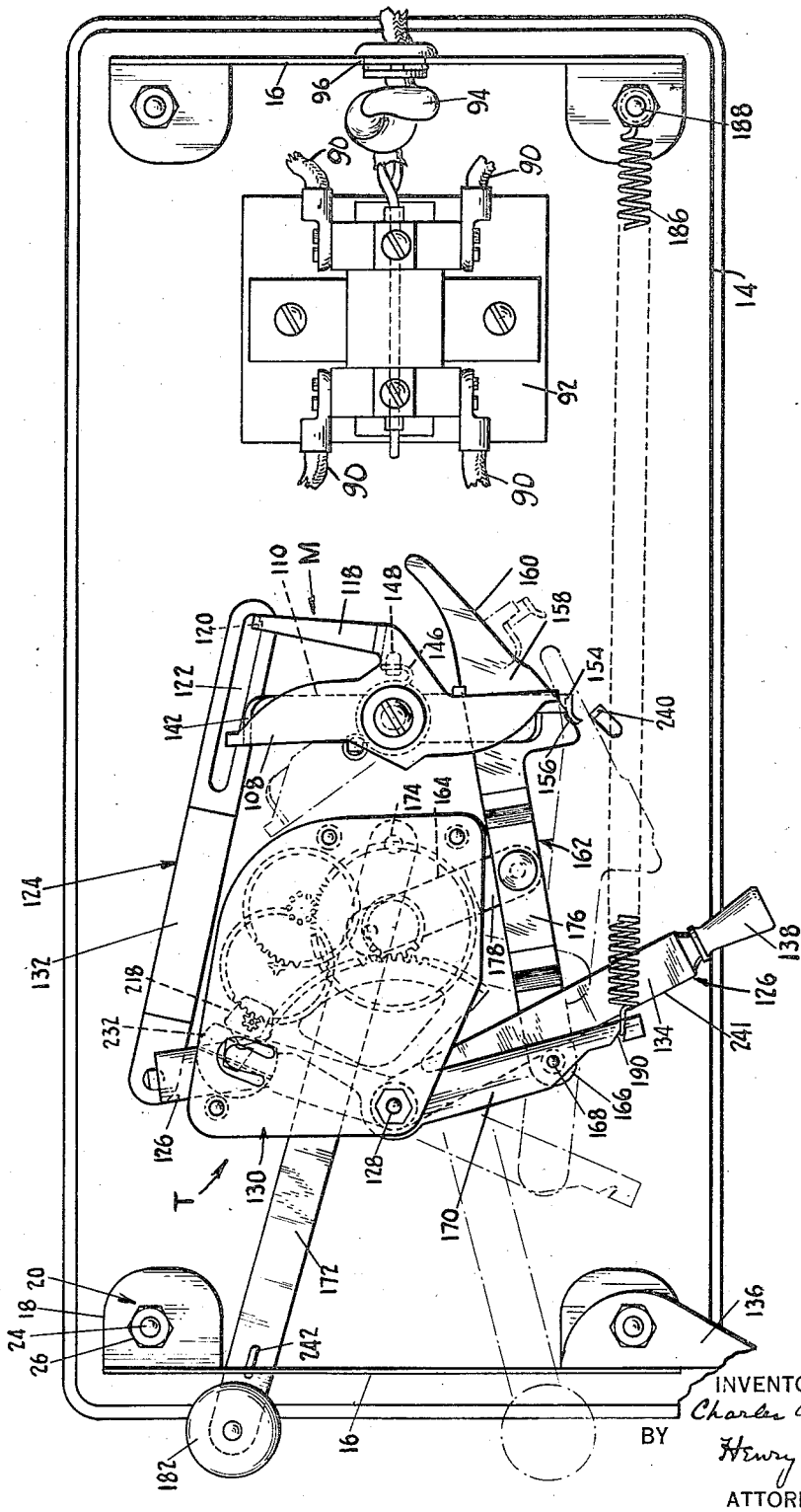

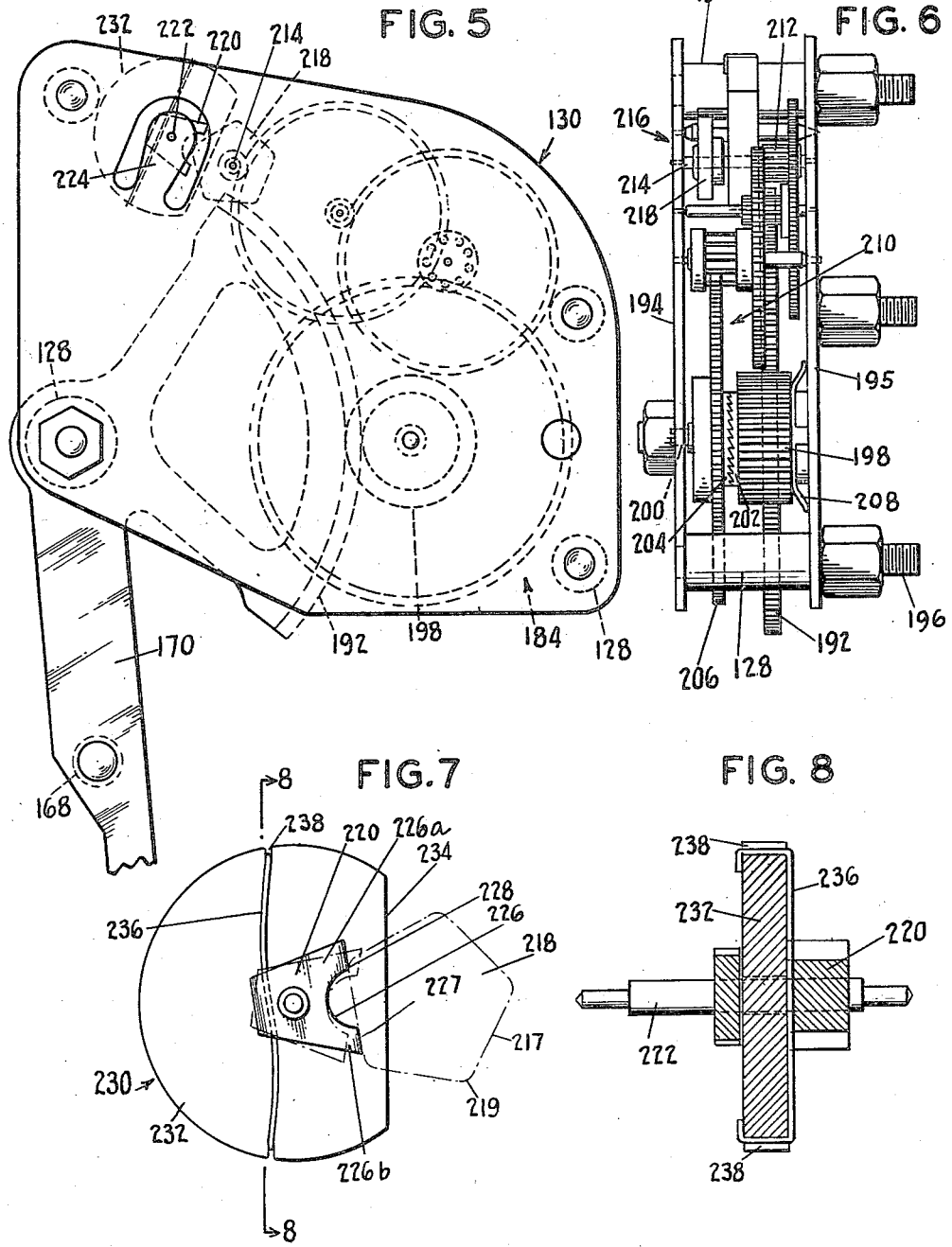

Nov. 6, 1934.  C. A. SCHALLIS  1,979,845
AUTOMATIC TOASTER
Filed Nov. 4, 1929  5 Sheets-Sheet 5

INVENTOR
Charles A. Schallis
BY Henry Lanahan
ATTORNEY

Patented Nov. 6, 1934

1,979,845

UNITED STATES PATENT OFFICE 1,979,845

AUTOMATIC TOASTER

Charles A. Schallis, Lincoln Park, N. J., assignor to Thomas A. Edison, Incorporated, West Orange, N. J., a corporation of New Jersey Application November 4, 1929, Serial No. 404,810

35 Claims. (Cl. 161—16)

This invention relates to automatic toasters, and particularly to an arrangement in which the article to be toasted is retained in a predetermined position, while the heating units or grates are movable with respect to such article. For the toasting process, the grates are closed upon or about the article to be toasted, while for charging or removing the bread or toast the grates are open. The grates are retained in toasting position for a predetermined time, at the expiration of which they are released and open to terminate or retard the toasting. After opening, the heating units are retained sufficiently close to the article so that the heat radiated by the units, which are preferably continuously energized, serves to keep the article warm while at the same time a certain amount of heat may be transferred by convection to the article.

It is an object of this invention to provide an improved automatic toaster in which the heat transfer to the article to be toasted continues for a predetermined time at a high rate, and then is decreased to a lower rate, which may merely maintain the article hot.

Further objects of this invention are to provide improved means for controlling the length of the toasting period within certain limits, and to provide such means which may be arranged to render the action of the timing means ineffective to release the grates from toasting position and may also be used to terminate the toasting period independently of the timing means.

It is a further object of this invention to provide, in conjunction with apparatus such as described, a setting device for predetermining the toasting period which, when once set, may be left in set position for consecutive toasting operations, unless it should be desired to change the toasting period, or to lock the toaster closed, or prematurely to open the toaster.

It is a further object of this invention to provide means for driving the timing mechanism and energized by the operation of closing the grates.

It is a further object of this invention to provide an improved arrangement having heat radiating units which are mounted for simultaneous movement to and from closed and open positions in relation to an article to be heated, and wherein when said units are in open position the radiated heat is partly dissipated before striking said article, so that a lesser degree of heat is supplied by direct radiation, while at the same time a substantial current of heated air flows transversely of the article to heat it by convection.

It is a further object of this invention to provide an arrangement which in the operation of closing the grates, will simultaneously effect the positioning of the opening means so that the latter will be actuatable to release the grates at the end of a predetermined interval and permit them to open.

Further objects of this invention are to provide an improved construction and arrangement for closing, latching, releasing and opening the heating units, and also for cushioning the fall or impact of the heating units in their opening movement.

It is a further object of this invention to provide a simple and improved form of bread rack.

Still other objects, features and advantages of my invention will be set forth in or understood from the specification and the appended claims.

My invention, both as to its fundamental principles and as to its particular embodiments, will best be understood by reference to the specification and accompanying drawings, in which:

Figure 3 is an enlarged end elevation view, similar to Figure 2, but partly broken away to show the interior construction.

Figure 4 is a plan view of the base section of the toaster, with the upper portions removed therefrom, showing the mechanism in locked position.

Figure 5 is a plan view of the timing mechanism.

Figure 6 is a side elevation view of the timing mechanism.

Figure 7 is a plan view of a detail of the escapement in said timing mechanism.

Figure 8 is a transverse sectional view on lines 8—8 of Figure 7, of said detail.

Figure 9 is a detail sectional view, on lines 9—9 of Figure 3, illustrating the position of parts of the apparatus when the heating units are retained in toasting position.

Figure 10 is a view, similar to Figure 9, showing the normal position of the parts involved in Figure 9, after the retaining means has been released and the toaster has opened.

Figure 11 is a fragmentary part sectional view, on line 11—11 of Figure 2, illustrating the mounting of the heating means, and of the article holder, with respect to the end walls of the said toaster.

Figure 1:
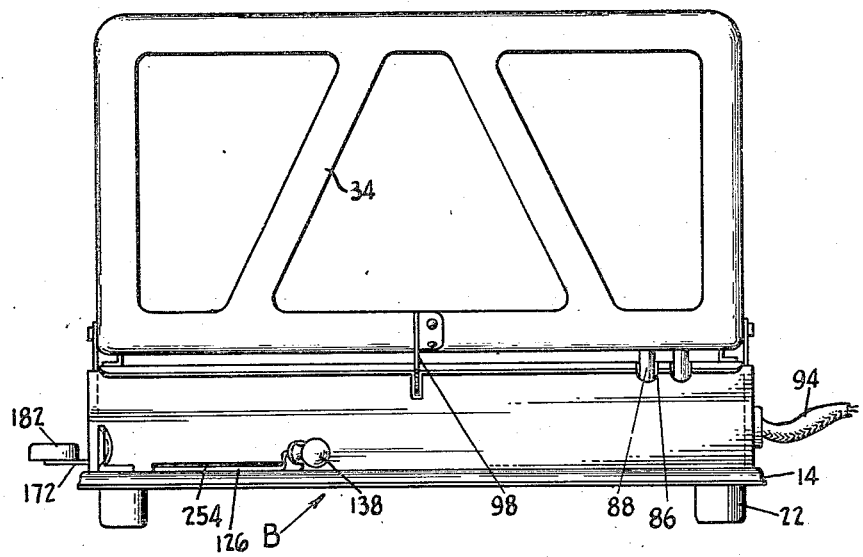
Figure 1 is a side elevation view of an automatic toaster, according to my invention.

In the drawings, in which I have shown by way of example a preferred embodiment of my invention, the toaster is shown as comprising a base B upon which are supported the heating units H, for which closing, latching, and releasing mechanism M is provided to bring the units into toasting position with respect to bread holder or grid G. The timing mechanism T, mounted on the base B, cooperates with the mechanism M to trip said mechanism and permit the heating units H to move away from the grid G, upon the expiration of a predetermined time after closing the grates to initiate the toasting operation.

The base B may be made of a suitable metal stamping 10, around the edge of which a downturned flange 14 is formed. Walls 16 are securely mounted at each end of stamping 10 by means of the inturned flanged 18 (Fig. 4) and suitable securing means 20 passing through said inturned flanges and stamping 10. The securing means 20 may include feet 22, preferably of suitable heat insulating material, having bolts 24, or the like, formed therein, which extend through suitable openings in stamping 10 and flange 18 to receive nuts 26.

End walls 16 are preferably sufficiently rigid to support between them the heating units H, which are pivotally mounted on said end walls by means of pins 28, carried thereby and sprung or otherwise secured in suitable bearing openings 30 in end plates 16. The heating units H may thus be readily assembled, or removed with respect to end walls 16.

Two heating units H are preferably mounted for movement toward and away from each other, and each unit comprises a dish-shaped member 32 of substantially rectangular contour. Members 32 are made of any suitable material, preferably metal, capable of being plated or polished, for ornamental purposes. Corrugations 34, may be formed in the surface 36 of said member for ornamental and strengthening purposes. Any suitable type of heating unit may be mounted within the dish-shaped members 32. However, I prefer to utilize the construction shown in which there is provided a frame consisting of an angle strip 40 and a second angle strip 42 retained positively in position on angle strip 40 so that insulating plates 43, preferably of mica, or the like, may be clamped between extending ledges 44 and 46 of strips 40 and 42, respectively. Strip 40 may have ears 48 formed therewith, to be turned over and down upon strip 42 to retain ledge 46 in clamping engagement with the face of plates 43. Ears 48 may also engage and secure the angularly disposed ends of cross braces 50 which extend transversely of plates 43, and which carry portions 52 extending through and bent over to engage said plates, preferably intermediate thereof, to retain the same rigidly in position spaced from surface 36.

The heating or resistance element 54 which preferably is of nichrome wire or ribbon, or any other suitable heater, may be arranged on plate 43, in any suitable manner. In the present embodiment, terminals 56 for resistance element 54 are located at the middle of the bottom of insulating plate 43, and the resistance wire or ribbon extends away from each of said terminals 56 and is threaded thru openings 58 formed in plate 43. Openings 58 are so arranged that resistance element 54 may be passed back and forth across one part of plate 43 and then back and forth across the other part of the plate, the distance between adjacent transverse strands increasing, as the openings 58 approach the top edge of the dish-shaped member 32 with most of the resistance wire on the toast side of the plate. When the heating unit is in toasting position, the greatest radiation of heat will thus be at the bottom portion of plate 43. However, the upper portion of the article to be heated will be heated to a greater extent than the lower parts by the heated air rising from the bottom of the container to the top. Thus, by suitably varying the spacing of the heater elements from bottom to top, a uniform toasting action is developed over the entire surface to be toasted.

An advantage of this construction is that the heating unit assembly may be completed, after which the unit may be mounted in members 32 and secured therein as by rivets passing through the outer edges 38 of members 32 and through strips 40 and 42.

Heating units H are so proportioned and arranged that when moved to a substantially upright position, in the manner hereinafter described, they substantially enclose the bread holder or grid G. Grid G is supported on a base plate 60, at each end of which is formed a downturned flange 62. Screws 64, or the like passing through end walls 16, engage flange 62 to fix the position of grid G with reference to the heating units H. Plate 60 is formed to provide downwardly inclined lateral edges 66, against which the bottom faces 68 of members 32 are arranged to abut eventually to limit the downward movement of heating units H.

A bread cage 70, preferably made of a unitary stamping of sheet metal, has downwardly extending legs 72. Ears 74 are provided on legs 72 and are received into suitable openings in plate 60, to be bent under, for the purpose of securing said cage in position on said plate. Bottom faces 68 of members 32 are cut out, as at 75, to avoid interference with legs 72 of grid G in the movement of units H. Bread cage 70 is preferably oblong in shape, and in this construction, is shown of sufficient size to receive two pieces of bread, although it should be understood that there is no limitation in the size of said retainer, other than in connection with the heating units H used therewith.

Retainer 70 is formed in box shape, the longitudinal side walls of which are cut out to leave only the upright bracing members 78, which are twisted away from the plane of the sides of retainer 70, for strengthening purposes and to increase the surface of articles held in retainer 70 exposed to radiated heat. A beaded edge 80, and inturned edges 82 provide additional strength for the structure. While the bottom 84 of retainer 70 is substantially closed, plate 60 is provided to form an entirely closed bottom for grid G, to minimize the passage of crumbs, or other droppings, into the mechanism housed on the base B.

At one end of plate 60 at either side thereof, are provided a number of notches 86, in which a number of metallic tubes 88 swing with grates H. Tubes 88 are firmly secured at one end, in any suitable manner, within suitable openings provided in the bottom faces 68 of the members 32 and provide conduits for lead-in wires 90. Tubes 88 are so positioned that wires 90 for each grate or unit H pass within the space between plate 43 and surface 36, and said wires 90 are therefore protected to an appreciable degree, by plate 43 from the heat of the heating element 54. Wires 90 preferably have a covering of asbestos, or the like, and pass down from the units H to a terminal block 92, mounted on stamping 10, and insulated therefrom in any suitable manner. From block 92, a cable 94 leads out, passing through an opening 96 in one of end walls 16, to be connected to any suitable source of electrical energy. It is to be noted that while the toaster is in use, the resistance element 54 may be at all times in circuit with the source of energy, for reasons hereinafter pointed out. A switch may be provided in cable 94 if desired.

Secured to surface 36 of each unit H, at the middle of the bottom thereof, is a locking arm 98, projecting downwardly, and terminating in an angularly disposed camming portion 100. Camming portion 100 consists of two plane portions 102 and 104, disposed substantially at right angles to each other. Camming portion 100 is adapted to be engaged by portions of the closing, latching, and release mechanism M, of which the closing cam 108 forms a part. Cam 108 is rotatably carried upon latch 110, and cam and latch are pivotally mounted upon a post 112, secured to the stamping 10. (See Figures 4 and 9.)

Cam 108 is formed with curved, bevelled edges 114, which are positioned to engage camming portions 100 of arms 98 to move the arms outwardly, and thus swing the heating units H upwardly into toasting position. A projection 116 at the end of each curved edge 114 engages the portion 104 of the corresponding arm 98 to prevent movement of cam 108 beyond the position at which heating units H are in toasting position, and the inner ends of the edges 114 of cam 108 may be substantially normal to arms 98 when the grates are open, to aid in supporting the grates in open position.

Cam 108 is provided with a finger 118 downwardly offset therefrom, and having a down turned end 120 registering with a slot 122 in one end of the closing link 124. The other end of closing link 124 is pivotally secured to one end of closing lever 126, which is intermediately pivoted on a post 128, carried by the frame 130 of timing mechanism T, hereinafter described. Intermediate portions 132 and 134 of the link 124 and lever 126 are bent downwardly to provide rests for supporting said link and said lever 126 upon the stamping 10. A thumb rest 136 is clamped under one of the nuts 26, in proximity to the handle 138 of lever 126, for the convenient operation of the latter. When lever 126 is moved toward rest 136, the end 120 of finger 118 will be engaged by link 124, and cam 108 will be rotated clockwise to move the arms 98 outwardly and thereby move the heating units H to closed or toasting position.

Latch 110 is formed with a substantially oblong body, of slightly less length than the cam 108, the width of said body being substantially uniform except at the outer ends thereof, at which point the rounded, bevelled edge portions 140 are formed. The width of said body is greater, at said rounded edge portions, than that of the superimposed cam 108 at the corresponding points. (See Figure 9.) Adjacent the rounded edge portions 140, the ends of latch 110 are cut off sharply to provide bevelled straight edges 142.

A downwardly turned lug 144 on latch 110 provides an end terminal for a coil spring 146 which is wound around post 112 and has the other end thereof secured to a lug 148, struck up from stamping 10. The action of spring 146 is to move latch 110 clockwise to follow cam 108 as the latter is moved to close the heating units. As the arms 98 ride out upon the curved edges 114 of the cam 108, the latch 110 follows, until the plane portions 102 have been moved beyond the straight edges 142; spring 146 then becomes effective to move latch 110 so that edges 142 will be within plane portions 102, to retain heating units H in the raised position, until the latch is tripped. An upturned finger 150 on latch 110 coacts with a straight side edge 152 of the cam 108 to prevent movement of said latch beyond said cam 108, under the influence of spring 146. Also, when the latch 110 has been released, as hereinafter explained, the reaction of spring 146 is transmitted from latch 110 through portion 150 to cam 108 to cushion the downward motion of units H, as said cam rides out along arms 98.

Latch 110 is also provided with a downwardly extending arm 154, formed with a rounded end 156, with which a cam trip plate 158 is adapted to coact to move the latch 110 counter clockwise against the action of spring 146, to remove edges 142 from engagement with the plane portions 102, and permit the heating units H to drop, of their own weight, away from the grid G. Cam plate 158, carried at the end of lever 162 is formed with a camming edge 160 engaging with the rounded end 156 of latch 110. Lever 162 is pivoted intermediate its ends on link 164, and at its end 166 on post 168, which in the preferred construction, is carried by the driving arm 170 of the timing mechanism T, for a purpose hereinafter appearing. Link 164 is pivotally mounted at its inner end on timing lever 172 at an intermediate point of the latter, said lever being pivotally secured at its inner end to a post 174, carried on frame 130. Lever 162 and link 164 are formed with depressed surfaces 176 and 178 respectively, which rest upon stamping 10 for supporting said lever and said link, while the body of lever 172 rests upon said stamping for a similar purpose.

Lever 172 extends through a slot 180 in the front end plate 16, and is bent upwardly, at its forward end portion, from said stamping 10, to provide a resilient portion. Said resilient portion is provided with an operating button 182 by means of which said lever may be moved to move the camming edge 160 outwardly, referring to Figure 4, into contact with the rounded end 156 of latch 110 and then to move the latch 110 for disengaging the straight edges 142 from the plane portions 102, to release the grates H, the link 164 serving to move lever 162 outwardly upon post 168 as a pivot.

Preferably the operation of the releasing mechanism M is timed to occur after a predetermined period, the length of which is controlled by the setting of timing lever 172, in cooperation with the clockwork 184 of timing mechanism T, in the manner hereinafter explained. Clockwork 184 is driven by means of a coiled spring 186, anchored at one end to a post 188, which may be one of the screws 24, and engaged at the other end within a notch 190 at the outer end of driving arm 170, which is preferably coaxially mounted with the closing lever 126 on frame 130. Arm 170 has formed integrally therewith the arcuate gear sector 192, for engagement with clockwork 184 to drive the clock mechanism as will be explained.

Clockwork 184 is mounted within the frame 130 preferably consisting of two parallel plates 194 and 195, held in spaced relation by means of the supports 196, which are secured within the stamping 10. Post 128, upon which closing lever 126 and driving arm 170 are pivoted, may also provide spacing means for said plates. Sector 192 engages gear 198, carried slidably and rotatably upon the shaft 200. One end surface of gear 198 is provided with ratchet teeth 202 with which engage complementary teeth 204 on the side of a gear 206, mounted on shaft 200; a leaf spring 208 pressed between the other end surface of gear 198 and bottom plate 195 yieldingly retains teeth 202 and 204 in engagement so that, as driving arm 170 is moved counter clockwise in Figure 5, by spring 186, gear 206 will be rotated, while when arm 170 is rotated clockwise, gear 198 rotates freely therewith and with respect to gear 206.

Gear 206 is the first gear of a gear train 210, the last gear 212 of which drives a shaft 214, at the upper end of which is affixed one element of the escapement 216. Escapement 216 includes a pentagonal plate 218, the sides 217 of which are substantially straight and of equal length, and the vertices 219 of which are slightly rounded to reduce frictional resistance and wear in said escapement. Plate 218 is carried at the upper end of shaft 214, and coacts with a cupped member 220, fixedly mounted upon shaft 222, supported between bottom plate 195 and a prong 224 cut out of the upper plate 194. Member 220 has a recess 226 formed therein, defining arms 226a and 226b normally facing in the direction of plate 218. The face 227 of member 220 in which recess 226 is formed is preferably otherwise plane.

The depth of the recess 226 is just sufficient so that one of the vertices 219 of plate 218 may enter therein, wherein it will have sufficient play, substantially as shown in Figure 5 wherein the escapement is shown centered. Shafts 214 and 222 are so located that upon counter clockwise rotation of the shaft 214 with the escapement thus centered the vertex 219 in the recess 22e will strike against arm 226b rotating the member 220 clockwise (see Figure 5). Further movement of said vertex, due to the action of spring 186 through the gear train 210, carries said vertex out of the recess; still further rotation of plate 218 will be hindered by the contact of a side 217 thereof with the face of arm 226a as shown in Figure 7. This side 217, now engaging surface 227, will tend to cam member 220 in the reverse direction from that in which it has been moving, while the plate 218 tends to continue movement in the same direction as before, under action of spring 186. This camming action will continue until the next vertex 219 slides over the corner 228 into recess 226 when said vertex will strike against arm 226b, thereby again reversing the movement of the member 220. In this manner, the intermittent oscillatory motion of the member 220 tends to restrain movement of the gear train 210, and therefore of the driving arm 170, in a regularly timed operation.

Escapement 216 operates in conjunction with a pendulum 230, which comprises the cylindrical section 232, having a portion thereof cut away, adjacent the shaft 214, to provide the straight edge 234, thus forming an unbalanced element, and also providing for properly spacing shaft 214 in relation thereto. Section 232 is loosely mounted below the member 220 on shaft 222 for rotational movement thereon relative both to member 220 and to shaft 222. A thin wire spring 236 is secured through cup member 220, and engages slots 238, cut in the peripheral surface of section 232. It is to be noted that shaft 222 is not fixed and that its rotational movement is therefore limited only through the escapement coaction of member 220 and plate 218. Further, the action of the pendulum 230 is actually that of a spring centered device, supplying energy to cupped member 220 for proper rebound in its coaction with the vertexes 219 and the sides 217 of plate 218, the spring 236 cushioning the action of the cylindrical section 232, which for this purpose, is made of a heavy piece of metal.

In this manner, the driving arm 170 will be rotated through a predetermined angle on the post 128 in a definite period of time, determined by the escapement 216, by force applied to said arm by the spring 186. As previously set forth trip lever 162 is carried on post 168, fixed to arm 170; therefore, simultaneously with the counter clockwise movement of arm 170, lever 162 will move to the right in Figure 4 carrying camming edge 160 toward the rounded end 156 on latch 110 until contact is made, and the latch released as already described. A prong 240 may be struck up from the stamping 10, to act as a stop to limit the movement of the cam plate 158, against over travel, so that the end of said plate will always be properly positioned with respect to the rounded end 156 of latch 110, after the latter has been rotated, together with cam 108, by the arms 98, during the opening operation.

Closing lever 126, is so mounted that a side edge 241 thereof will be brought into contact with the downwardly extending post 168 on lever 170 when said lever 126 is operated to effect the closing of the heating units H, whereupon the arm 170 will be moved against the action of spring 186, and the ratchet teeth 202 and complementary teeth 204 will so coact that gear 198 will be moved freely with respect to gear 206 and counter to its normal direction of movement until the latch 110 operates to latch the grates closed, in the manner described, and the closing operation is completed. In this manner, arm 170 is positioned for each operation in substantially the same initial position for successive operations. Thereafter, as the arm 170 moves, under the action of the spring 186, the post 168 will move the lever 126 slowly back towards the position from which it was moved to effect the closing of the heating units H, the lost motion arrangement at slot 122 and end 120 permitting this movement of lever 126 without disturbing the position of the latch 110 and cam 108 until the latch is tripped by cam plate 158.

The camming edge 160 of plate 158 is angularly disposed to the direction of travel of the lever 162 under the action of driving arm 170. Therefore, by positioning plate 158 further inwardly from rounded end 156, the time period necessary to elapse before engagement of the edge 160 of said plate or trip with the latch to effect release may be made greater. This positioning operation is carried out by means of the release and time control lever 172 the forwardly extending resilient portion of which has a pressed-up projection 242 which is adapted to coact with notches 244 formed in the upper edge of slot 180 to yieldably fix the relative positioning of the apparatus.

When lever 172 has been set in position with respect to a notch 244, the point of connection of link 164 thereto becomes substantially fixed; thereafter, the movement of lever 162 is substantially that of a part of a pantograph linkage, so that a point in the camming edge 160 would inscribe a substantially straight line across base B over its movement. Because of the angularity of edge 160, different points therein will engage the rounded end 156 for different settings of lever 172, and the time necessary for cam edge 160 to reach tripping position depends on the setting of lever 172; the farther 172 is set in a clockwise direction (in Figure 4) the longer the time required.

An additional notch 246 may be provided in the upper edge of slot 180, into which lever 172 may be moved at one limit of its movement. In this position, cam plate 158 has been moved so far inward, that side edge 241 of lever 126 will engage the support post 196 which is adjacent the connection of link 124 and lever 126, thus restraining further movement of arm 170, before camming edge 160 engages the latch, and providing a permanently closed adjustment. Another notch 248 at the other end of the upper edge of slot 180 may be provided at the position to which lever 172 is moved, if it is desired to release latch 110 prematurely, by manual movement of cam plate 158, before timing mechanism T has operated to move the cam plate 158 into the proper releasing position. These operations arise from the proper proportioning and association of the lever 172, link 164, lever 162, driving arm 170, and cam plate 158. Suitable indicia 249 may be provided adjacent the several notches 244 for indicating the results obtained by moving lever 172 to the positions of said notches, or the relative times of operation resulting from such settings.

For properly housing the mechanism supported on the base B, two side cover plates 252 are provided. Plates 252 are suitably slotted to coact with arms 98 and with tubes 88. One of the said plates may have a slot 254 for permitting the lever 126 to pass out therethrough, said slot providing stop means for limiting the movement of said lever, either when being returned by driving arm 170, or when being moved to close the heating units H. Said plates also are held in position by the downwardly inclined edges 66 of plate 60, so that crumbs, falling from the grid G, tend to fall out over said plates, and not within the said base. Suitable flanges 256 are adapted to overlap the end walls 16, while downwardly extending fingers 258 engage within slots in stamping 10 to retain said plates in assembled relation, from which they may be readily removed for repairs to the mechanism supported on base B.

Figure 2:
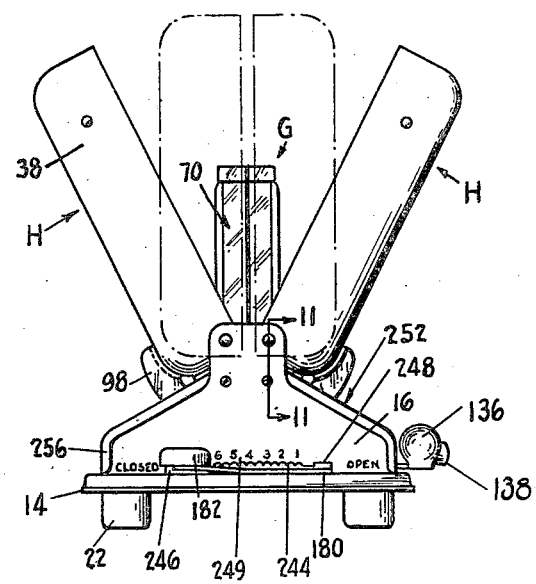
Figure 2 is an end elevation view of said toaster, with the heating units in open position, in full lines, and in closed position, in dotted lines.
Figures 12, 13:
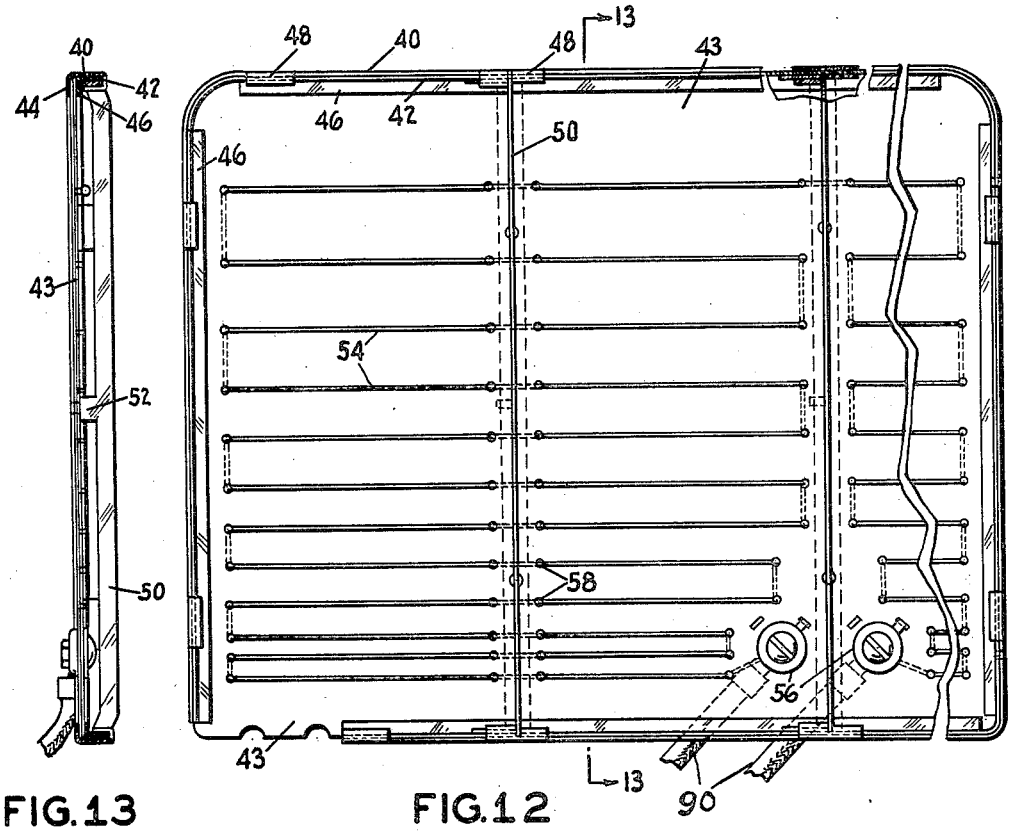
Figure 12 is a front elevation of the toast side of the grate unit before assembly in the casing.
Figure 13 is a section on line 13—13 of Figure 12.
Figures 14, 15:
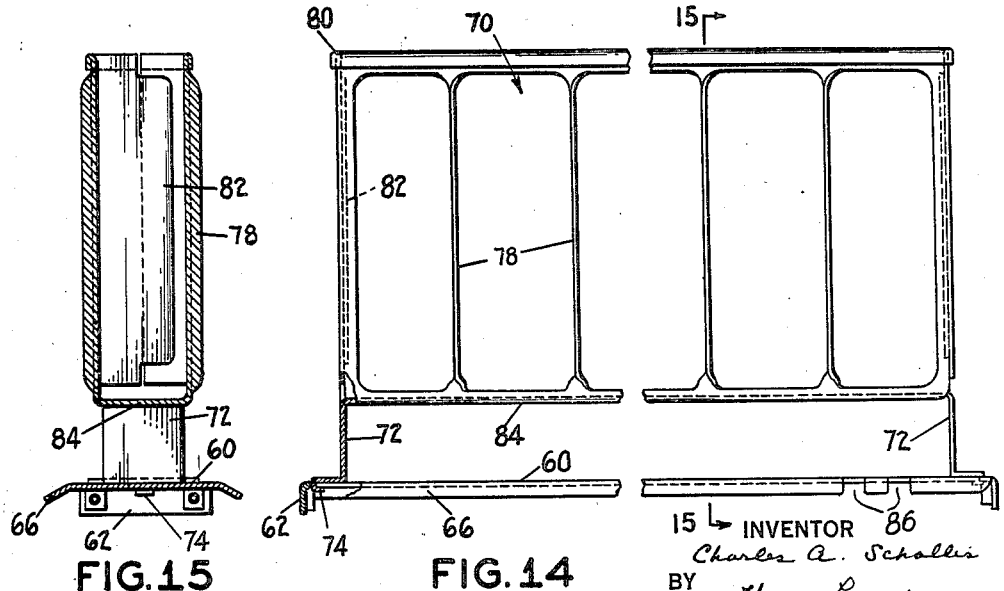
Figure 14 is a front elevation of the bread rack.
Figure 15 is a sectional view taken on line 15—15 of Figure 14.

Briefly in the operation of the apparatus if the heating units H are locked in closed position by having left the lever 172 in notch 246 and having permitted the timing mechanism to run down, lever 172 is moved toward notch 248, whereupon camming edge 160 engages the rounded end 156 of the latch and moves the latter to release the straight edges 142 from coaction with the plane portions 102, thus permitting the grates to fall of their own weight. Bread, or any other article to be heated or toasted, is then inserted into the retainer 70, electrical connection having previously been made through cable 94 to the source of supply, the closing lever 126 is operated so that cam 108 will be actuated to move heating units H upwardly until the latch 110 properly engages with arms 98. Then, upon moving the lever 172 into proper relation with any one of the notches 244, the apparatus may be allowed to operate until the timing mechanism T effects the engagement of the camming edge 160 with the rounded end 156 to release the latch 110. The heating units H will now fall away from the retainer 70 into the position shown in full lines on Figure 2. However, current will still pass through the resistance elements 54, so that heat therefrom will still be available to keep toast, or other articles in retainer 70, warm, after the operation of toasting or the like. If desired, the units H may be opened prematurely by moving the lever 172 toward or into notch 248. When the operation of toasting or the like is completed, and it is desired to place the heating units in proper position for storing or the like, the lever 172 is set in notch 246; then, either lever 126 is operated to close the units H, or the heater units H are simultaneously moved upwardly by hand, whereupon latch 110 will become operative to retain the units in closed position.

It will be understood that while I have shown and described certain preferred embodiments of my invention, modifications and changes may be made as will be understood by those skilled in the art, without departing from the spirit and scope of my invention, and consequently matters shown and described herein are to be interpreted as illustrative and not in limitation within the scope of the attached claims.

I claim:

1. In an automatic heating apparatus of the class described, a support for an article to be heated, means for heating said article, said means being shiftable to apply heat to said article at different rates, means for releasing said heating means after a predetermined period from high heating position, and controlling means cooperable with said releasing means and adjustable to control the length of said period, said controlling means also being adjustable to a position in which it will remain unchanged by any other part of the apparatus in the normal operation of the latter and in which it will prevent release of said heating means from high heating position by said releasing means.

2. In an automatic heating apparatus of the class described, a support for an article to be heated, means for heating said article, said means being shiftable to apply heat to said article at different rates, means for releasing said heating means from high heating position after a predetermined period, and controlling means cooperable with said releasing means, said controlling means being selectively adjustable to control the length of said period, to cause release of said heating means from high heating position before the expiration of said period, and to a position in which it will remain unchanged by any other part of the apparatus in the normal operation of the latter and in which it will prevent release of said heating means from high heating position by said releasing means.

3. In combination, a support for an article to be heated, a heating unit mounted for movement toward said support, means movable relatively to said heating unit and adapted in such relative movement thereof to move said unit toward said support, said means including a cam engaging said unit, and a latch associated with said cam and movable with respect to said unit to and from a given position in which it directly engages and locks such unit in a position adjacent said support.

4. In combination, a support for an article to be heated, a heating unit mounted for movement toward said support, means movable relatively to said heating unit and adapted in such relative movement thereof to move said unit toward said support, said means including a cam engaging said unit, a latch associated with said unit and with said cam and movable with respect to said unit to and from a given position in which it directly engages and locks such unit in a position adjacent said support, and a trip for releasing said latch.

5. In combination, a support for an article to be heated, a heating unit mounted for movement toward said support, and means for closing and locking said unit against said support, said means comprising a closing member on said unit, a cam engaging said closing member, and a latch resiliently associated with said cam, and movable to and from a given position in which it directly engages and locks said unit in closed position.

6. In combination, a support for an article to be heated, a heating unit mounted for movement toward said support, and means for closing and locking said unit against said support, said means comprising a movable cam engaging said unit and adapted upon movement thereof in a given direction to close such unit, and a latch biased to a given position in which it directly engages and holds said unit in closed position.

7. In combination, a support for an article to be heated, a pair of heating units secured to said support on opposite sides thereof and movable toward an article in said support, means for closing and locking said units against said article, said means comprising contact faces at the lower sides of said units, closing cams engaging said contact faces to close said units, and latch mechanism arranged to maintain said units in closed position, said cams and latch mechanism being mounted below said units.

8. In an automatic heater of the class described, a base, an article holder positioned above said base, a pair of heating units movably supported by said base adjacent said article holder, and means for closing and latching said units adjacent an article in said holder, said means comprising a closing cam movably mounted on said base and a latch for engaging said units adjacent the lower sides thereof.

9. In an automatic heater of the class described, a base, an article holder positioned above said base, a pair of heating units movably supported by said base adjacent said article holder, and means for closing said units about an article in said holder, said means comprising a closing cam pivoted on said base and engaging the lower portions of said units.

10. In an automatic heater of the class described, a base, an article holder positioned above said base, a pair of heating units movably supported by said base adjacent said article holder, and means for closing said units about an article in said holder, said means comprising a cam pivotally mounted on an axis normal to the said base and engaging the lower portion of one at least of said units.

11. In an automatic heater of the class described, a base, an article holder positioned above said base, a pair of heating units pivotally supported on horizontal axes adjacent their lower sides, and means for closing said units, said means comprising a pair of cams mounted on a vertical axis below said units and engaging the lower portions thereof.

12. In an automatic heater of the class described, a heating unit movable with respect to an article to be heated, a latch engaging said unit to fix the position thereof, a trip having a cam surface for releasing said latch, timing means for driving said trip in a direction to engage said latch and manual means for moving said trip in a direction substantially normal to said first direction to vary the time of release of said latch independently of adjustment of said timing means.

13. In an automatic heater of the class described, a heating unit movable with respect to an article to be heated, a latch engaging said unit to fix the position thereof, a trip having a cam surface for releasing said latch, timing means for driving said trip in a direction to engage said latch, and means for moving said trip in a direction substantially normal to said first direction to vary the time of release of said latch independently of said timing means, said trip and said means being so adjustable as to maintain said trip and said latch out of contact to prevent release of said latch.

14. In an automatic heater of the class described, a heating unit movable with respect to an article to be heated, a latch engaging said unit to fix the position thereof, a trip having a cam surface for releasing said latch, timing means for driving said trip at an angle to said surface in a direction to engage said latch, and means for moving said trip in a direction substantially normal to said first direction to vary the time of release of said latch.

15. In an automatic heater of the class described, a heating unit movable with respect to an article to be heated, a latch engaging said unit to fix the position thereof, a trip having a cam surface for releasing said latch, timing means for driving said trip in a direction to engage and release said latch, and manual means for moving said trip in a direction substantially normal to said first direction to engage and release said latch independently of said timing means.

16. In an automatic heater of the class described, a heating unit movable with respect to an article to be heated, a latch engaging said unit to fix the position of said unit, a trip having a cam surface for releasing said latch, timing means for driving said trip in a direction to engage and release said latch, and manual means for moving said trip in a direction substantially normal to said first direction to selectively engage and release said latch independently of said timing means or to prevent releasing contact of said trip with said latch.

17. In an automatic heater of the class described, a base plate, a heating unit movable about an axis parallel to said base plate, a latch mounted above said base plate and engaging the lower portion of said unit to fix the position thereof, a trip movable parallel to said base plate for engaging and releasing said latch, and timing means for driving said trip.

18. In an automatic heater of the class described, a base plate, an article support above said base plate, a pair of heating units mounted for swinging movement on axes parallel to said base plate, said units being positioned on opposite sides of said article support and control mechanism for closing and opening said units, said mechanism being mounted upon said base plate below said units.

19. In an automatic heater of the class described, a base plate, an article support above said base plate, a pair of heating units on opposite sides of said article support and mounted for movement toward and away therefrom, and control mechanism for closing and opening said units mounted upon said base plate below said units, said mechanism comprising means for closing and latching said units, a time control, means whereby said time control is energized upon the closing of said units, and means operable by said time control for opening said units.

20. In an automatic heater of the class described, a base plate, an article holder mounted above said base plate, a pair of heating units on opposite sides of said article holder mounted for movement toward and away therefrom, and control mechanism for closing and opening said units mounted upon said base plate below said units, said mechanism comprising means for closing and latching said units, a time control means whereby said time control is energized upon the closing of said units, means operable by said time control for opening said units and means for varying the period required for operation of said time control means to open said units.

21. In an automatic heater of the class described, in combination, an article holder, a heating unit mounted for swinging movement toward and away from said article holder, said unit having a camming face, means movable with respect to said unit for engaging said face to close the unit, means for driving said engaging means in a direction to cause the same to close said unit, a latch movable with respect to said unit and adapted to engage said face to secure said unit in closed position, a latch release associated with said closing means, and a time control for driving said release.

22. In an automatic heater of the class described, in combination, an article holder, a heating unit mounted for swinging movement toward and away from said article holder, said unit having a camming face, means movable with respect to said unit for engaging said face to close the unit, means for driving said engaging means in a direction to cause the same to close said unit, a latch movable with respect to said unit and adapted to engage said face to secure said unit in closed position, a latch release associated with said closing means, timing means for actuating said release, and means for energizing said timing means.

23. In an automatic heater of the class described, in combination, a base plate, a heating unit mounted above said base plate for swinging movement about a horizontal axis, a downwardly extending closing member secured to said unit, a closing cam mounted upon said base plate for rotation about a vertical axis in engagement with said closing member, and a latch mounted coaxially with said cam and biased to engage said closing member to latch said unit in closed position.

24. In an automatic heater of the class described, in combination, a base plate, a pair of heating units mounted above said base plate for swinging movement about horizontal axes, a downwardly extending closing member secured to each of said units, a double face closing cam mounted upon said base plate in line with said members for rotation about a vertical axis in engagement with said closing members, and a double face latch mounted coaxially with said cam and biased to engage said closing members to latch said units in closed position.

25. In an automatic heater of the class described, in combination, a base plate, a heating unit mounted above said base plate for swinging movement about a horizontal axis, a downwardly extending closing member secured to said unit, a cam member mounted upon said base plate for rotation about a vertical axis in engagement with said closing member, a latch member mounted coaxially with said cam member, and biased to engage said closing member to latch said unit in closed position, and a projection on one of said cam and latch members engaging the other whereby said cam member is limited in one direction of movement by said latch member.

26. In an automatic heater of the class described, in combination, a base plate, a heating unit mounted above said base plate for swinging movement about a horizontal axis, a downwardly extending closing member secured to said unit, a cam mounted upon said base plate for rotation about a vertical axis in engagement with said closing member, a latch mounted coaxially with said cam and biased to engage said closing member, to latch said unit in closed position, and means for permitting relative rotation of said cam and latch in one direction from a predetermined point while preventing relative movement in the other direction from said point.

27. In an automatic heater of the class described, in combination, a base plate, a heating unit mounted above said base plate for swinging movement about a horizontal axis, a downwardly extending closing member secured to said unit, a cam mounted upon said base plate for rotation about a vertical axis in engagement with said closing member, a latch mounted coaxially with said cam and biased to engage said closing member to latch said unit in closed position, and means for permitting relative rotation of said cam and latch in one direction from a predetermined point while preventing relative movement in the other direction from said point, said cam having means for engaging a closing link to swing said unit to closed position and said latch having means for engaging a trip for releasing said unit from closed position.

28. In an automatic heater of the class described, in combination, a base plate, a heating unit mounted above said base plate for swinging movement, a closing member secured to said unit, a closing cam and a latch coaxially mounted for rotation on said base plate in engagement with said closing member, and a manually operable actuating lever mounted on said base plate, said actuating lever and cam having a lost motion connection therebetween.

29. In an automatic heater of the class described, in combination, a base plate, a heating unit mounted above said base plate for swinging movement, a closing member secured to said unit, a closing cam and a latch coaxially mounted for rotation on said base plate in engagement with said closing member, a manually operable actuating lever mounted on said base plate, a driving connection between said lever and said cam, a trip for releasing said latch, timing mechanism for driving said trip, and a driving connection between said actuating lever and said timing mechanism for energizing the latter.

30. In an automatic heater of the class described, in combination, a base plate, a heating unit mounted above said plate and movable to control the amount of heat supplied thereby to an article, means for shifting said unit to a predetermined position, said means including a manually operable actuating lever, means for latching said unit in said position, release mechanism for said latch, and timing mechanism for driving said release mechanism, said release mechanism comprising a lever pivoted at a pair of points spaced apart, one of said pivot points being connected to said timing mechanism.

31. In an automatic heater of the class described, in combination, a base plate, a heating unit mounted on said base plate and movable to control the amount of heat supplied thereby to an article, means for latching said unit in position, release mechanism for said latch, and timing means for driving said release mechanism, said release mechanism comprising a trip lever pivotally connected at one end to a driving element of said timing means and at an intermediate point to a lever shiftable transversely of said trip lever.

32. In an automatic heater of the class described, in combination, a base plate, a heating unit mounted on said base plate and movable to control the amount of heat supplied thereby to an article, means for latching said unit in position, release mechanism for said latch, and timing means for driving said release mechanism, said release mechanism comprising an arm rotatable by said timing means, a trip lever having a cam face and pivoted at one end to said rotatable arm, a manually operable lever mounted for pivotal movement, and a link connected between intermediate points of said last named lever and said trip lever.

33. In an automatic heater of the class described, in combination, a base plate, a heating unit mounted on said base plate and movable to control the amount of heat supplied thereby to an article, means for latching said unit in position, release mechanism for opening said latch, and timing means for driving said release mechanism, said release mechanism comprising an arm rotatable by said timing means, a trip lever having a cam face arranged to engage and release said latching means, said lever being pivoted at one end to said rotatable arm, a manually operable lever mounted for pivotal movement and having means for indicating relative timing adjustment thereof, and a link pivotally connecting intermediate points of said manually operable lever and said trip lever whereby adjustment of said manually operable lever controls the time required for said trip lever to release said latch.

34. In a toaster, a bread rack comprising a single integral metallic member having a bottom, openwork side plates extending upwardly from said bottom, and end members extending inwardly from said side members at each end thereof, said end members being arranged in overlapping relation.

35. In a toaster, a bread rack comprising a single integral metallic member having a bottom, openwork side members extending upwardly from said bottom, and end members extending inwardly and in overlapping engagement at each of the opposite ends of the rack, the upper edges of said side members being bent over upon themselves.

CHARLES A. SCHALLIS.